United States Patent Office 3,318,166
Patented May 9, 1967

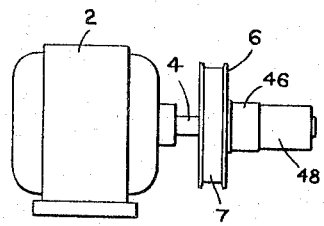
FIG. 1
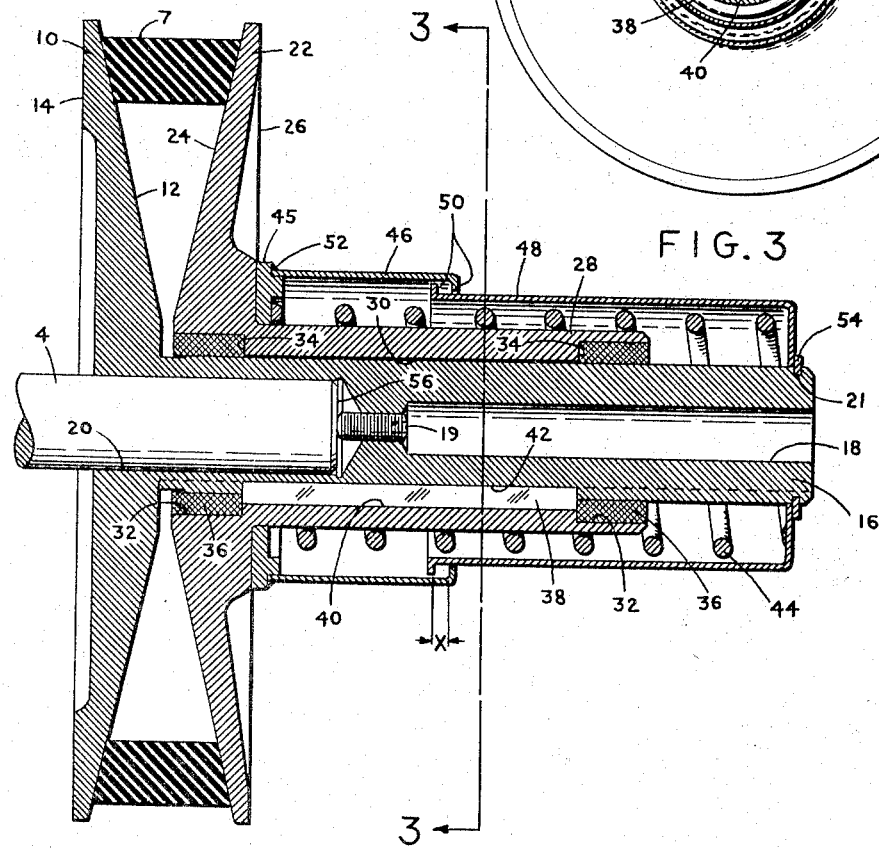
FIG. 3
FIG. 2
INVENTORS
VERN A ANDERSON
GEORGE L. DURNEY, DECEASED
BY JUNE L. DURNEY,
     WIDOW
BY Daniel H. Bobis
          Atty

3,318,166
NON-LUBRICATED VARIABLE SPEED
MOTOR PULLEY
Vern A. Anderson, Oil City, Pa., and George L. Durney, deceased, late of Rouseville, Pa., by June L. Durney, widow, Rouseville, Pa., assignors, by mesne assignments, to Eaton Yale & Towne Inc., Cleveland, Ohio
Filed Nov. 27, 1964, Ser. No. 415,220
3 Claims. (Cl. 74—230.17)

This invention relates to a variable speed, V-belt power transmission system, and more particularly, to an improved pulley which requires no lubrication and which will be free from "fretting."

The pulley consists of a flange fixed to a motor shaft, another flange axially slidable with respect to the fixed flange, and a spring urging the slidable flange toward the fixed one. As is well known in this type of pulley, the adjustment of the moveable flange causes the belt to engage at different portions of the conical surfaces of the flanges. This changes the effective diameter of the pulley which affects the speed of the pulley to be driven. Thus, as the sliding flange moves toward the fixed flange, the effective diameter of the pulley increases, the belt speed increases, and the rotational speed of the driven pulley increases proportionately. Conversely, as the sliding flange moves away from the fixed flange, the belt engages a smaller effective diameter of the pulley, the belt speed decreases and the rotational speed of the driven pulley decreases.

It is an object of this invention to provide an improved pulley which requires no lubrication and which will eliminate problems inherent to lubrication maintenance. It is another object to provide self lubricating bushings disposed between the flanges to prevent metal to metal contact between the flanges thereby eliminating wear, fretting, and noise. Other objects of the invention are to provide a drive key made of a non-metallic material with low frictional characteristics so as to eliminate key and keyway wear and to eliminate noise; to provide jackscrew means which allows the pulley to be dismounted from the motor shaft quickly and easily without the need of a wheel puller and without the risk of damaging the pulley which is inherent in driving it off the shaft; to provide a compression spring cartridge to urge the slidable flange toward the fixed flange, the cartridge having a safety feature which prevents the compression spring from flying away from the unit and possibly injuring a workman.

Various other objects and advantages will appear from the following description of one embodiment of the invention, and the novel features will be particularly pointed out hereinafter in connection with the appended claims.

FIGURE 1 is a side elevation of the V-belt power transmission system embodying the present invention.

FIGURE 2 is a vertical sectional view of the invention shown in FIGURE 1.

FIGURE 3 is a vertical sectional view taken along line 3—3 of FIGURE 2.

In the embodiment of the invention illustrated in the drawings is a motor 2, having a shaft 4 on which is mounted the improved pulley 6. The pulley 6 drives a belt 7 which in turn drives a driven pulley (not shown).

The pulley 6, as shown in FIGURE 2 has a first flange 10 which is fixed to the shaft 4. This flange has a coned inner face 12, and an outer face 14. A hub 16 projects from the coned face. The hub 16 has a bore 18 part way therethrough which receives a jackscrew 19 to be described hereinafter and a larger bore 20 which receives the shaft 4. An annular groove 21 is formed near the end of the hub.

A second flange 22 is disposed about the hub 16 of first flange 10 and is axially slidable thereto. It has a coned inner face 24 which faces toward the inner face 12 of first flange 10 and an outer face 26. A hub 28 extends from the outer face 26 of the second flange. Hub 28 is shorter in length than hub 16 and has a bore 30 therethrough which is slightly larger in diameter than the outside diameter of hub 16 to permit flange 22 to slide along hub 18 without contacting it.

At each end of hub 28 is an annular groove 32 which forms a shoulder 34.

A pair of bushings 36 are mounted in annular grooves 32 and are bonded firmly in the grooves and against the shoulders 34. These bushings may be bonded with an epoxy or other suitable cement, retained with a snap ring (not shown), press fit or connected by any other suitable means so that they will remain fixedly connected to flange 22 and will slide along the outer surface of the hub 16 of flange 10. The bushings 36 provide the sliding contact between flanges 10 and 22 and are made of carbon graphite or suitable low friction material to prevent fretting, to prevent wear, to eliminate the need for lubrication and to eliminate noise.

Located between the bushings 36 and held firmly in place by them is drive key 38 which provides a driving connection between the first flange 10 and the second flange 22 and prevents relative rotation between them. Drive key 38 has one side disposed in a longitudinal, internal groove 40 of hub 28 and has its opposite side disposed in a longitudinal, external groove 42 of hub 16 as shown in FIGURES 2 and 3. Drive key 38 is made of a non-metallic material of low frictional characteristic, such as nylon and also serves to eliminate key and keyway wear, to prevent fretting, to eliminate the need for lubrication, and to eliminate noise. Since the drive key is held between the carbon graphite bushings 36, it becomes part of the assembly consisting of the flange 22 and the bushings 36 and moves with them relative to the fixed flange 10.

A compression spring 44 urges the second flange 22 toward the first flange 10. This spring is disposed about hub 28 of second flange 22 and acts on a retainer 45 which abuts the outer face 26 of flange 22. Spring 44 is confined in a housing which consists of two cylinders 46 and 48 in telescopic association with each other. Cylinders 46 and 48 each have flanges or lips 50 which are adapted to cooperate to limit the separation of the cylinders. Cylinder 46 is welded to retainer 45 as shown at 52.

A retaining ring 54 is disposed in the aforementioned annular groove 21 in hub 16 of first flange 10 to retain spring 44 in a compressed state. When retaining ring 54 is removed, the spring extends in length the distance X which is the distance cylinder 48 travels until its flange or lip 50 locks with the flange or lip 50 of cylinder 46. This prevents spring 44 and housing cylinder 48 from flying out at a high velocity and possibly injuring the person who is disassembling the pulley from the motor shaft 4.

A jackscrew 19 is disposed in bore 18 of hub 16 of flange 10 and is threadably connected to the hub to bear on the end 56 of shaft 4. This jackscrew facilitates removal of the pulley from the shaft and eliminates the need to use a wheel puller and the risk of damaging the pulley by driving it off.

It will be understood that various changes in the details, materials, steps and arrangements of parts, which have been herein described and illustrated in order to explain the nature of the invention, may be made by those skilled in the art within the principle and scope of the invention as expressed in the appended claims.

We claim:
1. A variable speed pulley adapted to be mounted on a shaft and to coact with a belt comprising:
   a first flange fixedly connected to the shaft and having an elongated hub axially projecting from one side thereof,
   a second flange having an elongated hub projecting from one side thereof and slidably disposed about the elongated hub of the first flange in non-contacting relationship, the elongated hub of said second flange having a pair of axially spaced annular grooves, a pair of graphite bushings to prevent fretting, said bushings being disposed in said annular grooves and in bearing engagement with the surface of said elongated hub of said first flange for providing a sliding surface for relative movement between said first and second flanges,
   means for operatively connecting said first and second flanges, and means for urging said second flange towards said first flange.
2. A variable speed pulley adapted to be mounted on a shaft and to coact with a belt comprising:
   a first flange fixedly connected to the shaft and having an elongated hub axially projecting from one side thereof,
   a second flange having an elongated hub projecting from one side thereof and slidably disposed about the elongated hub of the first flange in non-contacting relationship, the elongated hub of said second flange being axially shorter than the elongated hub of said first flange,
   the elongated hub of said second flange having a pair of axially spaced annular grooves,
   a pair of lubricant-free bushings of suitable low-friction material to prevent fretting, said bushings being disposed in said annular grooves and in bearing engagement with the surface of the said elongated hub of said first flange for providing a sliding surface for relative axial movement between said first and second flanges,
   a first longitudinal groove along the outer surface of the hub of said first flange,
   a second longitudinal groove along the inner surface of the hub of said second flange,
   a drive key disposed in said longitudinal grooves between said bushings for operatively connecting said first and second flanges to prevent relative rotation therebetween, the axial ends of said drive key abutting the respective innermost edges of said bushings so as to prevent axial movement of said key relative to said bushings,
   and spring means normally urging said second flange towards said first flange.
3. The apparatus in claim 2 wherein said bushings are graphite.

References Cited by the Examiner
UNITED STATES PATENTS

| | | | |
|---|---|---|---|
| 1,522,983 | 1/1925 | Strassner. | |
| 2,203,149 | 6/1940 | Hoover | 74—230.17 |
| 2,711,103 | 6/1955 | Miner | 74—230.17 |
| 2,724,945 | 11/1955 | McGhee | 308—238 |
| 2,842,355 | 7/1958 | Lang | 74—230.17 |
| 2,852,951 | 9/1958 | Miner | 74—230.17 |
| 2,937,042 | 5/1960 | Wilder. | |
| 3,149,405 | 9/1964 | Dolan. | |
| 3,175,409 | 3/1965 | Macy | 74—230.17 |

DONLEY J. STOCKING, *Primary Examiner.*

DAVID J. WILLIAMOWSKY, *Examiner.*

L. H. GERIN, *Assistant Examiner.*